United States Patent
Lindoff et al.

(10) Patent No.: US 9,949,316 B2
(45) Date of Patent: Apr. 17, 2018

(54) RECONFIGURATION IN A WIRELESS MESH NETWORK

(71) Applicant: Telefonaktiebolaget L M Ericsson (publ), Stockholm (SE)

(72) Inventors: Bengt Lindoff, Bjarred (SE); Magnus Astrom, Lund (SE)

(73) Assignee: TELEFONAKTIEBOLAGET LM ERICSSON (publ), Stockholm (SE)

(*) Notice: Subject to any disclaimer, the term of this patent is extended or adjusted under 35 U.S.C. 154(b) by 0 days.

(21) Appl. No.: 14/648,905

(22) PCT Filed: May 26, 2015

(86) PCT No.: PCT/EP2015/061585
§ 371 (c)(1),
(2) Date: Jun. 1, 2015

(87) PCT Pub. No.: WO2016/188567
PCT Pub. Date: Dec. 1, 2016

(65) Prior Publication Data
US 2016/0352568 A1    Dec. 1, 2016

(51) Int. Cl.
*H04W 24/04*    (2009.01)
*H04W 76/02*    (2009.01)
(Continued)

(52) U.S. Cl.
CPC ............. *H04W 76/06* (2013.01); *H04L 45/70* (2013.01); *H04W 40/22* (2013.01); *H04W 76/045* (2013.01); *H04W 84/18* (2013.01)

(58) Field of Classification Search
None
See application file for complete search history.

(56) References Cited

U.S. PATENT DOCUMENTS 7,889,713 B2 * 2/2011 Zheng ............... H04L 45/00
                                                          370/328
2004/0203787 A1   10/2004 Naghian
(Continued)

FOREIGN PATENT DOCUMENTS

WO    2009129853 A2    10/2009
WO    2014205692 A1    12/2014

OTHER PUBLICATIONS

PCT International Search Report, dated Jan. 29, 2016, in connection with International Application No. PCT/EP2015/061585, all pages.
(Continued)

*Primary Examiner* — Duc T Duong
(74) *Attorney, Agent, or Firm* — Leffler Intellectual Property Law, PLLC (57) ABSTRACT

There is provided mechanisms for reconfiguration in a wireless mesh network served by at least one network node. A method is performed by a first network device having a first metric. The method comprises maintaining an operative connection to a network node via a second network device, the second network device having a better metric than the first metric. The method comprises acquiring an indication that the first network device is to be detached from the operative connection to the network node. The method comprises scanning for, and establishing an operative connection to, a further second network device having a metric, for establishing a new operative connection to one of the at least one network node. The method comprises updating the first metric based on the metric of the further second network device.

34 Claims, 7 Drawing Sheets

(51) Int. Cl.
  *H04W 84/18*  (2009.01)
  *H04W 76/06*  (2009.01)
  *H04W 76/04*  (2009.01)
  *H04W 40/22*  (2009.01)
  *H04L 12/721* (2013.01)

(56) References Cited

U.S. PATENT DOCUMENTS

| | | | | |
|---|---|---|---|---|
| 2010/0103850 A1* | 4/2010 | Gossain | ............ | H04W 72/0426 370/312 |
| 2011/0188452 A1 | 8/2011 | Borleske et al. | | |
| 2013/0279410 A1* | 10/2013 | Dublin | ................. | H04W 40/02 370/328 |
| 2014/0056210 A1* | 2/2014 | Jafarian | ................ | H04W 88/04 370/315 |
| 2014/0086042 A1* | 3/2014 | Van Gruenen | .......... | H04L 45/22 370/221 |
| 2014/0369270 A1* | 12/2014 | Seibert | ................. | H04W 16/14 370/329 |
| 2015/0382275 A1* | 12/2015 | Pragada | ................ | H04W 40/12 370/236 |
| 2016/0007273 A1* | 1/2016 | Farid | .................... | H04W 48/16 370/329 |
| 2016/0007278 A1* | 1/2016 | Gupta | ................... | H04W 40/12 370/329 |
| 2016/0037396 A1* | 2/2016 | Lee | ................... | H04W 36/0055 370/329 |
| 2016/0212698 A1* | 7/2016 | Guo | ................... | H04W 52/0203 |
| 2016/0302096 A1* | 10/2016 | Chari | ................... | H04W 40/12 |
| 2017/0156113 A1* | 6/2017 | Visuri | ............... | H04W 52/0229 |

OTHER PUBLICATIONS

PCT Written Opinion, dated Jan. 29, 2016, in connection with International Application No. PCT/EP2015/061585, all pages.

* cited by examiner

RECONFIGURATION IN A WIRELESS MESH NETWORK

TECHNICAL FIELD

Embodiments presented herein relate to wireless mesh networks, and particularly to a method, a network device, a computer program, and a computer program product for reconfiguration in a wireless mesh network.

BACKGROUND

In communications networks, there may be a challenge to obtain good performance and capacity for a given communications protocol, its parameters and the physical environment in which the communications network is deployed.

For example, wireless networks suffer from issues of having a limited range and unreliable communications. This may cause data sometimes to be received corrupted at the receiver end. As a means to mitigate the range limitations, wireless mesh networks have been developed. In wireless mesh networks network devices acting as intermediary relay nodes relay data from the source to the destination and hence extends the range of the network devices in the wireless mesh network.

Connectivity of a wireless mesh network describes the ratio with which network devices can reach another network devices or network node in a network. In the case of a fully connected network all network devices and network nodes are able to reach all other network devices and network nodes.

Commonly, machine type communication (MTC) in sensor or meter networks is performed towards a single recipient. This single recipient may typically be a server configured to receive sensor or metering data. As a consequence, the only relevant connection, on an applications level, for a network device in such a network is with the server configured to receive data from the network device. In this case the network is thus fully connected if all network devices can communicate with said server. For such a network, a proactive routing mechanism, in which paths are maintained by periodic signaling, is suitable since only one route (i.e., the route to the server) needs to be maintained for all network devices. Hence, if a network device is able to find another network device operatively connected to the server it may itself connect to the server through that network device.

For e.g., the metering application, a rational mesh organization is related to the cost of connecting to the mesh gateway in order to reach the server. A network device closer, e.g., fewer relays and/or better channel conditions, to the gateway can be said to have a good metric. Correspondingly, a network device farther away, e.g., more relays and/or worse channel conditions is said to have a bad metric. A network device linked to a network device having a better metric than itself is a child to said network device, whereas it is a parent to a network device linked to itself having a worse metric than itself.

Wireless mesh networks may be dynamic in the sense that individual network devices may move within the wireless mesh network. However the wireless mesh network itself is usually static in the sense that it covers a relatively fixed geographical area e.g., by means of network nodes acting as access points. A network device that for some reason is detached from the network is then unable to communicate.

Wireless mesh networks are becoming more and more common to be as sensor or meter networks e.g., for electricity or water meters, or for containers loaded on a ship or a shipyard. Such networks are required to be fully connected i.e., all network devices in the network must be able to connect either directly or through at least one other network device to the facilitating server. Some of the network devices in such a network will only be able to connect to the server through a single relay node making that network device entirely dependent on said relay node. In the event of such a relay node dropping out of the network, e.g., due to battery outage or the relay node being moved, the network device becomes detached and will no longer be able to connect to the server through the particular relay node.

Hence, there is a need for improved mechanisms for reconfiguration in a wireless mesh network.

SUMMARY

An object of embodiments herein is to provide efficient mechanisms for reconfiguration in a wireless mesh network.

According to a first aspect there is presented a method for reconfiguration in a wireless mesh network served by at least one network node. The method is performed by a first network device having a first metric. The method comprises maintaining an operative connection to a network node via a second network device, the second network device having a better metric than the first metric. The method comprises acquiring an indication that the first network device is to be detached from the operative connection to the network node. The method comprises scanning for, and establishing an operative connection to, a further second network device having a metric for establishing a new operative connection to one of the at least one network node. The method comprises updating the first metric based on the metric of the further second network device.

Advantageously this provides an efficient mechanism for reconfiguration in a wireless mesh network.

According to a second aspect there is presented a network device for reconfiguration in a wireless mesh network served by at least one network node. The network device has a first metric. The network device comprises processing circuitry. The processing circuitry is configured to cause the network device to perform a set of operations. The processing circuitry is configured to cause the network device to maintain an operative connection to a network node via a second network device, the second network device having a better metric than the first metric. The processing circuitry is configured to cause the network device to acquire an indication that the first network device is to be detached from the operative connection to the network node. The processing circuitry is configured to cause the network device to scan for, and establish an operative connection to, a further second network device having a metric, for establishing a new operative connection to one of the at least one network node. The processing circuitry is configured to cause the network device to update the first metric based on the metric of the further second network device.

According to a third aspect there is presented a computer program for reconfiguration in a wireless mesh network, the computer program comprising computer program code which, when run on a network device, causes the network device to perform a method according to the first aspect.

According to a fourth aspect there is presented a computer program product comprising a computer program according to the third aspect and a computer readable means on which the computer program is stored.

It is to be noted that any feature of the first, second, third and fourth aspects may be applied to any other aspect, wherever appropriate. Likewise, any advantage of the first aspect may equally apply to the second, third, and/or fourth aspect, respectively, and vice versa. Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The inventive concept is now described, by way of example, with reference to the accompanying drawings, in which.

DETAILED DESCRIPTION

The inventive concept will now be described more fully hereinafter with reference to the accompanying drawings, in which certain embodiments of the inventive concept are shown. This inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description. Any step or feature illustrated by dashed lines should be regarded as optional.

Figure 1:
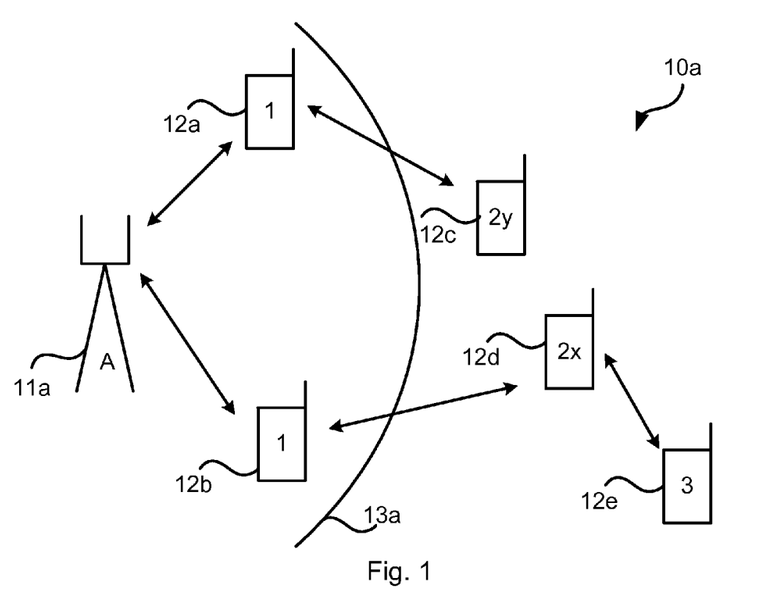
FIGS. 1 to 5 are schematic diagrams illustrating wireless mesh networks according to embodiments.

FIG. 1 is a schematic diagram illustrating a wireless mesh network 10a where embodiments presented herein can be applied. The wireless mesh network 10a comprises a network node 11a and network devices 12a-12e. The network node 11a may be any type of network node providing radio access to network devices within a coverage range 13a. For example, the network node 11a may be provided as a radio access node (radio base station; base transceiver station; node B, evolved node B) or as a wireless access point (AP). The network devices 12a-12e may be any type of network devices, such as any combination of portable wireless devices (mobile stations, mobile phones, handsets, wireless local loop phones, user equipment (UE), smartphones, laptop computers, tablet computers, relays, modems, sensors, etc., accessing services and data from the network node 11a, and/or providing data to the network node 11a.

In FIG. 1 the network node 11a, denoted network node A, acts as a gateway to a network outside the wireless mesh network 10a. Five network devices 12a-12e are involved in the wireless mesh network 10a. Network devices 12a, 12b are within the coverage range 13a of the network node 11a and thus have direct connection to the network node 11a and therefore have a good metric, represented by the metric value "1". As disclosed above, the communication may use any RAT. Network devices 12c, 12d, and 12e are outside the coverage region 13a and are labelled with metric values "2y", "2x", and "3", respectively; the network devices 12c, 12d that use network devices 12a, 12b as relays (or parent nodes) have metric value "2" and the network device 12e that uses network device 12d as relay (or parent node) has metric value "3". Thus, in view of FIG. 1, the metric used in the illustrative example represents the number of links in a path to the network node A; since network devices 12a, 12b each have direct links the metric value is "1" whereas for network devices 12c, 12d it is necessary that two respective links are established for network devices 12c, 12d to communicate with network node A. It is assumed that the metric values for the connected network devices 12a-12g are known, i.e. each network device knows its own metric value and also knows which network device (or devices) with worse metric values that is (are) operatively connected to that network device (i.e., it knows whether or not it acts as a relay to any child nodes). Further examples of metrics will be provided below.

Multiple mesh networks may exist in parallel within the same geographical area. For example the electricity network operates independently of the water metering network, etc. The home network and roaming networks may even belong to different operators, should the network operate in a licensed spectrum. For a network node 12c, 12d, 12e that becomes detached from its parent it could thus be beneficial to, instead of simply being detached from its own (first) network, be enabled to connect to another (second) network, possibly via a network device in the other network, thereby still being able to connect to the home network. This will change the connection setup for the detached network device as well as the network devices that are operatively connected to the detached network device.

There is thus a need for efficient reconfiguration of the wireless mesh network, for example, in case a link is dropped.

The embodiments disclosed herein therefore relate to mechanisms for reconfiguration in a wireless mesh network. In order to obtain such mechanisms there is provided a network device 12a-12g, a method performed by a network device 12a-12g, a computer program comprising code, for example in the form of a computer program product, that when run on processing circuitry of the network device 12a-12g, causes the network device 12a-12g to perform the method. There is also provided a system comprising a first network device, a second network device, a further second network device, and a third network device.

In the below disclosure network device 12d will be exemplified as acting as the first network device, network device 12b will be exemplified as acting as the second network device, network device 12c will be exemplified as acting as the further second network device, and network device 12e will be exemplified as acting as the third network device. However, as the skilled person understands, any of the network devices 12a-12g may act as a first network device, a second network device, a further second network device, and a third network device depending on the current topology of the wireless mesh network, such as currently available connections in the wireless mesh network and the relative locations of the network devices 12a-12g in the wireless mesh network.

Figure 6:
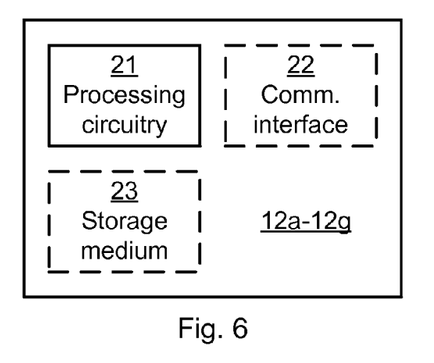
FIG. 6 is a schematic diagram showing functional units of a network device according to an embodiment.

FIG. 6 schematically illustrates, in terms of a number of functional units, the components of a network device 12a-

12g according to an embodiment. Processing circuitry 21 is provided using any combination of one or more of a suitable central processing unit (CPU), multiprocessor, microcontroller, digital signal processor (DSP), application specific integrated circuit (ASIC), field programmable gate arrays (FPGA) etc., capable of executing software instructions stored in a computer program product 31 (as in FIG. 8), e.g. in the form of a storage medium 23.

Particularly, the processing circuitry 21 is configured to cause the network device 12a-12g to perform a set of operations, or steps, S102-S122. These operations, or steps, S102-S122 will be disclosed below. For example, the storage medium 23 may store the set of operations, and the processing circuitry 21 may be configured to retrieve the set of operations from the storage medium 23 to cause the network device 12a-12g to perform the set of operations. The set of operations may be provided as a set of executable instructions.

Thus the processing circuitry 21 is thereby arranged to execute methods as herein disclosed. The storage medium 23 may also comprise persistent storage, which, for example, can be any single one or combination of magnetic memory, optical memory, solid state memory or even remotely mounted memory. The network device 12a-12g may further comprise a communications interface 22 for communications with at least one other network device 12a-12g and at least one network node 11a, 11b. As such the communications interface 22 may comprise one or more transmitters and receivers, comprising analogue and digital components and a suitable number of antennas for wireless communications. The processing circuitry 21 controls the general operation of the network device 12a-12g e.g. by sending data and control signals to the communications interface 22 and the storage medium 23, by receiving data and reports from the communications interface 22, and by retrieving data and instructions from the storage medium 23. Other components, as well as the related functionality, of the network device 12a-12g are omitted in order not to obscure the concepts presented herein.

Figure 7:
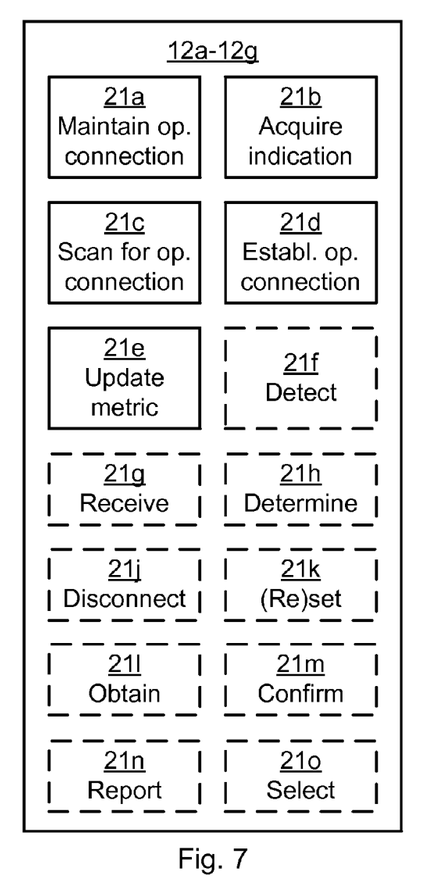
FIG. 7 is a schematic diagram showing functional modules of a network device according to an embodiment.

FIG. 7 schematically illustrates, in terms of a number of functional modules, the components of a network device 12a-12g according to an embodiment. The network device 12a-12g of FIG. 7 comprises a number of functional modules; a maintain operative connection module 21a configured to perform below steps S102, S102a (see FIGS. 9 and 10), an acquire indication module 21b configured to perform below step S104, a scan for operative connection module 21c configured to perform below step S108, an establish operative connection module 21d configured to perform below step S108, and an update metric module 21e configured to perform below step S118. The network device 12a-12g of FIG. 7 may further comprises a number of optional functional modules, such as any of a detect module 21f configured to perform below step S104a, a receive module 21g configured to perform below step S104b, a determine module 21h configured to perform below step S104c, a disconnect module 21j configured to perform below steps S110 and S112, a (re)set module 21k configured to perform below steps S108a and S118a, an obtain module 21l configured to perform below steps S108b, S108e, and S114, a confirm module 21m configured to perform below step S108c, a report module 21n configured to perform below steps S106, S116, S120, and S122, and a select module 21o configured to perform below step S108g. The functionality of each functional module 21a-21o will be further disclosed below in the context of which the functional modules 21a-21o may be used. In general terms, each functional module 21a-21o may be implemented in hardware or in software. Preferably, one or more or all functional modules 21a-21o may be implemented by the processing circuitry 21, possibly in cooperation with functional units 22 and/or 23. The processing circuitry 21 may thus be arranged to from the storage medium 23 fetch instructions as provided by a functional module 21a-21o and to execute these instructions, thereby performing any steps as will be disclosed hereinafter.

Figure 8:
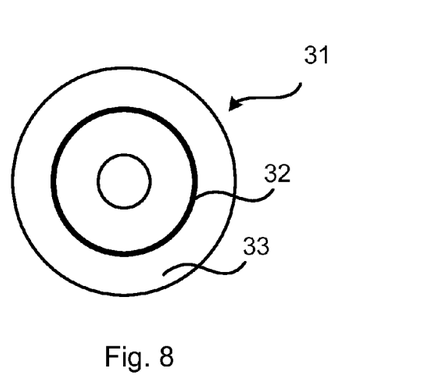
FIG. 8 shows one example of a computer program product comprising computer readable means according to an embodiment.

FIG. 8 shows one example of a computer program product 31 comprising computer readable means 33. On this computer readable means 33, a computer program 32 can be stored, which computer program 32 can cause the processing circuitry 21 and thereto operatively coupled entities and devices, such as the communications interface 22 and the storage medium 23, to execute methods according to embodiments described herein. The computer program 32 and/or computer program product 31 may thus provide means for performing any steps as herein disclosed.

In the example of FIG. 8, the computer program product 31 is illustrated as an optical disc, such as a CD (compact disc) or a DVD (digital versatile disc) or a Blu-Ray disc. The computer program product 31 could also be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory or a Flash memory, such as a compact Flash memory. Thus, while the computer program 32 is here schematically shown as a track on the depicted optical disk, the computer program 32 can be stored in any way which is suitable for the computer program product 31.

Figure 9:
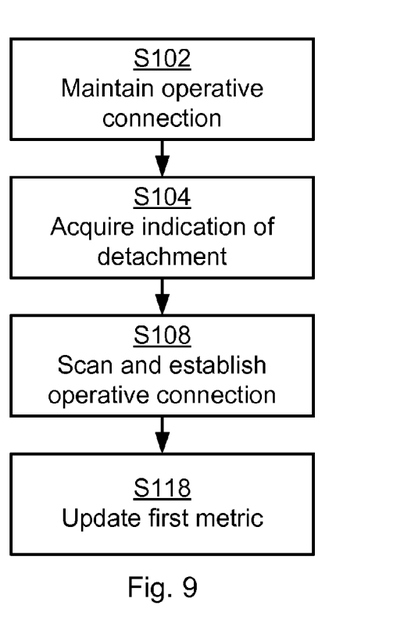
FIGS. 9 and 10 are flowcharts of methods according to embodiments.
Figure 10A:
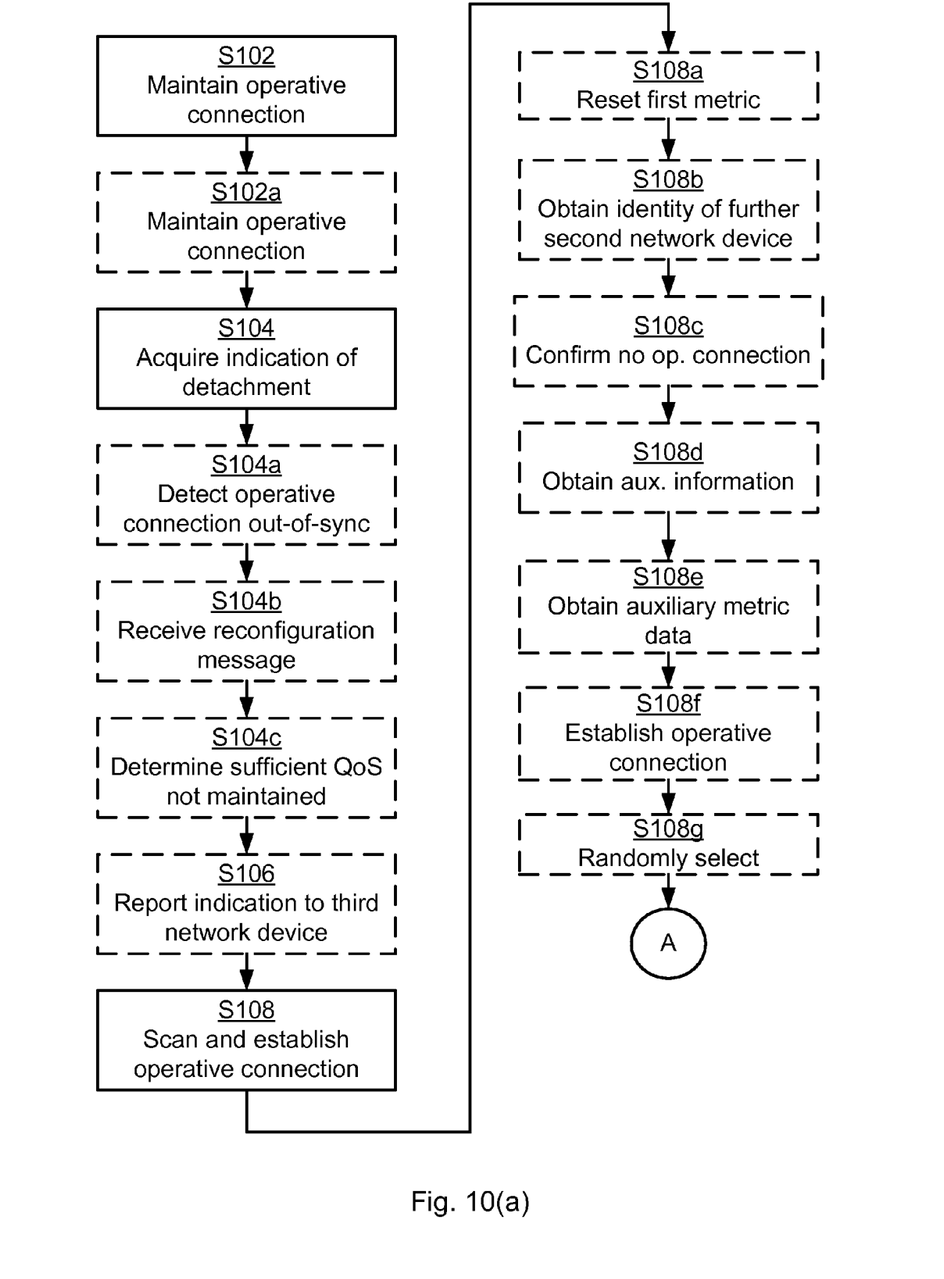
Figure 10B:
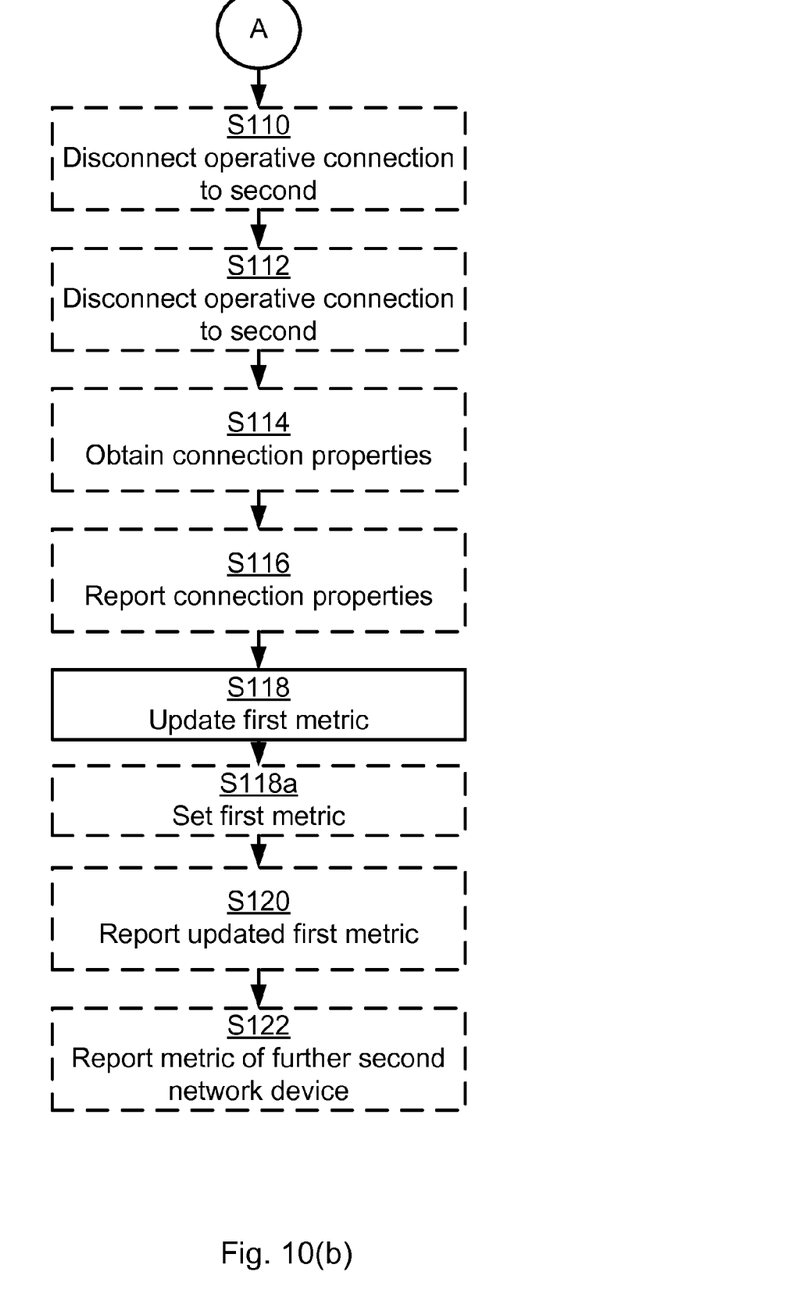

FIGS. 9 and 10 are flow chart illustrating embodiments of methods for reconfiguration in a wireless mesh network. The methods are performed by the network device 12a-12g. The methods are advantageously provided as computer programs 32.

Reference is now made to FIG. 9 illustrating a method for reconfiguration in a wireless mesh network as performed by a network device acting as a first network device 12d according to an embodiment.

The wireless mesh network is served by at least one network node 10a, 10b.

The first network device 12d is assumed to initially have a first metric. Examples of metrics will be provided below.

It is further assumed that the first network device has an ongoing operative connection to a network node 11a, 11b via a second network device. Hence, the first network device is configured to, in a step S1002, maintain an operative connection to the network node 11a, 11b via the second network device 12b. The second network device is assumed to have a better metric than the first metric.

The first network device is configured to, in a step S104, acquire an indication that the first network device is to be detached from the operative connection to the network node via second network device. Examples of such indications and how such an indication may be acquired will be provided below.

As a result of the acquiring of this indication the first network device seeks another network device so as to maintain an operative connection to the wireless mesh network. Hence, the first network device is configured to, in a step S108, scan for a further second network device. The first network device is further configured to, in said step S108, establish an operative connection to the further second network device (once such a further second network device is detected) for establishing a new operative connection to one of the at least one network node. The further second network device also has a metric. How this metric relates to the metric of the first network device and the metric of the second network device will be disclosed below.

As a result thereof the metric of the first device is updated. That is, the first network device is configured to, in a step S118, update the first metric based on the metric of the further second network device.

There are different examples of where the operative connection between the first network device and the network node is to be detached. For example, the operative connection to the network node may be detached between the first network device and the second network device. This is exemplified in the embodiment of FIG. 2, see below, where the operative connection between network device 12d and network device 12b is detached. For example, the operative connection to the network node may be detached between the network node and the second network device. Again, with reference to FIG. 2, this would have been the case if the operative connection between network device 12b and network node 11a were to be detached.

As noted above, the second network device acts as a parent of the first network node, the further second network device acts as a new parent of the first network node, and the third network node acts as a child of the first network node. Thus, the first network device may be regarded as being hierarchically downstream the second network device and hierarchically upstream the third network device in relation to a network node serving the wireless mesh network. However, this does not necessarily imply any direct geographical relation between the network devices; the third network device may be geographically closer to the network node than the first network device but still be required to establish and operative connection via the first network device to communicate with the network node (for example, due to fading, reflections, etc.). Thus, the term hierarchically downstream only implies a connection-wise relation between the network devices.

The scanning in step S108 may be performed using at least one other radio access technology (RAT) than the RAT used for the operative connection to the second network device. As the skilled person knows, the RAT is the underlying physical connection method for a radio based communication network. Examples of RATs include, but are not limited to, Bluetooth, Wi-Fi, and cellular network RATs such as used for accessing the Global System for Mobile Communications (GSM), Enhanced Data rates for GSM Evolution (EDGE), the Universal Mobile Telecommunications System, Wideband Code Division Multiple Access (WCDMA), High Speed Packet Access (HSPA), Evolved High Speed Packet Access (HSPA+), the Long Term Evolution (LTE) system and the mobile WiMAX system. The herein disclosed embodiments are not limited to any particular type of RAT and hence also covers any further ("5G") cellular RATs as long as the skilled person would know how to adapt the herein disclosed embodiments to such RATs.

Further, there may be different types of wireless mesh networks in which the herein disclosed embodiments apply. For example, the wireless mesh network may be operated using at least two RATs, it may be operated using at least one licensed frequency band, and at least one non-licensed frequency band, it may comprise at least two sub-mesh networks, it may provide at least two types of services, and/or be operated by at least two service providers.

Embodiments relating to further details of reconfiguration in a wireless mesh network will now be disclosed.

Reference is now made to FIG. 10 illustrating methods for reconfiguration in a wireless mesh network as performed by a network device acting as a first network device 12d according to further embodiments.

According to an embodiment the first network device has an ongoing operative connection to at least one third network device. Hence, the first network device may be configured to, in a step S102a, maintain an operative connection to the third network device. The third network device is assumed to have a worse metric than the first metric.

There may be different ways for the first network device to acquire the indication as in step S104. Different embodiments relating thereto will now be described in turn.

A first embodiment relates to a passive detachment; e.g., where a radio link between the second network device and the first network device is Out-of-Sync (OoS). Hence, the first network device may be configured to acquire the indication by, in a step S104a, detect that the operative connection to the second network device is Out-of-Sync.

A second embodiment relates to active detachment; e.g., where information from another network device is received, and where the first network device, as a result thereof, decides to detach from the second network device and scan for a new second network device. This information may be received in a reconfiguration message. Hence, the first network device may be configured to acquire the indication by, in a step S104b, receive a reconfiguration message from a network device having a metric better than the first metric.

A third embodiment relates to other aspects, such as quality of service or roaming costs, of the operative connection to the first network device. Particularly, the first network device may be configured to acquire the indication by, in a step S104c, determine that sufficient quality of service (QoS) of the operative connection to the second network device cannot be maintained and/or that a roaming cost associated with the operative connection to the second network device is higher than a threshold.

A fourth embodiment relates to yet other aspects. For example, the indication may be provided to indicate that the current first metric is worse than a threshold and as a result thereof the first network device may periodically perform the scanning in step S108 until a timer expires or until a further second network device is found. The timer may be started once the indication in step S104 is acquired.

There may be different ways for the first wireless device to act once it has acquired the indication as in any of steps S104, S104a, S104b, S104c. For example, the first network device may report the indication to other network devices. Particularly, the first network device may be configured to, in a step S106, report the indication to the third network device. This will make the third network device aware of the possible updated metric of the first network node, if the metric of the further second device is included in the indication.

In order for the first network device to be able to find a further second network device to establish an operative connection to, the first network device may be forced to set its metric to a value worse than its current value. Hence, the first network device may be configured to, in a step S108a, reset the first metric to a value worse than its current value during the scanning for the further second network device.

Once a further second network device has been found, the first network device may acquire its identity. Hence, the first network device may be configured to, in a step S108b, obtain an identity of the further second network device.

The metric of the further second network device may be worse than the metric of the second network device. Some additional examples, and embodiments relating thereto, of how the metric of the further second network device relates to the metric of the first network device and the metric of the second network device will now be disclosed.

According to a first embodiment the metric of the further second network device is better than (or equal to) the first metric (i.e., the first metric before reset).

According to a second embodiment the metric of the further second network device is worse than the first metric (i.e., the first metric before reset).

In this case the scanning in step S108 may need to involve below step S108c. It is assumed that the further second network device is not a child of the first network device. However, the first network device should verify that the further second network is not operatively connected to one of the children (as exemplified by the third network device) of the first network device since this would result in a circular routing. Hence, the first network device may be configured to, when the metric of the further second network device is worse than the first metric, perform the scanning by, in a step S108c, confirm that the further second network device is currently neither directly nor indirectly operatively connected to the third network device. This may avoid connections being established that would result in circular routing. There may be different ways for the first network device to perform the confirmation. For example, the first network device may be configured to perform the configuration by, in a step S108d, obtain auxiliary information about the further second network device. Particularly, the auxiliary information reveals any current operative hierarchical relation between the first network device and the further second network device. There are different types of such auxiliary information. Examples include, but are not limited to, address lists, as an identity lists of network devices currently being operatively connected to the further second network device, or any combination thereof. Further, there may be different sources from where such auxiliary information may be obtained. According to one example the auxiliary information is included in the metric of the further second device. According to one example the auxiliary information is provided by s server, such as a proxy. According to one example the first network device issues a request to the further second network device to provide the auxiliary information.

There may be different ways for the first network device to act in case at least two further second devices with identical metrics (i.e., the values of the respective metrics are identical) are found during the scanning in step S108. Different embodiments relating thereto will now be described in turn.

According to a first embodiment auxiliary metric data is use for the first network node to select which of the at least two further second network devices to establish the connection in step S108 to. Hence, the first network device may be configured to, in a step S108e, obtain auxiliary metric data from the at least two further second network devices. The first network device may then be configured to, in a step S108f, establish the operative connection to the one of the at least two further second network devices having best auxiliary metric data. Examples of such auxiliary metric data include, but are not limited to, remaining respective battery capacity of the at least two further second network devices, respective number of children of the at least two further second network devices, respective roaming costs associated with the at least two further second network devices, etc.

According to a second embodiment the first network node selects which of the at least two further second network devices to establish the connection in step S108 to by random. Hence, the first network device may be configured to, in a step S108g, randomly select which one of the at least two further second network devices to establish the operative connection to. This second embodiment may represent scenarios where auxiliary metric data is not available, and/or where a quick establishment of the operative connection is needed (thus not allowing available any auxiliary metric data to be exchanged and considered, as in step S108e).

There may be different ways for the first network device to determine when to establish the operative connection to the further second network device. Different embodiments relating thereto will now be described in turn.

For example, the first network device may disconnect from its current parent before establishing a connection to a new parent. That is, the first network device may be configured to, in a step S110, disconnect the operative connection to the second network device before establishing the operative connection to the further second network device. This may be a typical action combined with the above first embodiment of a passive detachment.

For example, the first network device may disconnect from its current parent only once a new parent has been found. That is, the first network device may be configured to, in a step S112, disconnect the operative connection to the second network device after having verified that the operative connection to the further second network node is to be established. This may be a typical action combined with the above second embodiment of an active detachment.

There may be different ways for the first network device to act once the operative connection to the further second network device has been established. For example, the first network device may report connection information of the operative connection to the further second network device to its children. Therefore, the first network device may be configured to, in a step S114, obtain connection properties from the further second network device. There are different examples of connection properties. Some examples include, but are not limited to, capacity, cost, quality of service, identity of the further second network device, or any combination thereof. These connection properties may then be reported to the children of the first network device. Hence, the first network device may be configured to, in a step S116, report the connection properties to the third network device.

Further aspects of the metric of the first network device will now be described in turn.

For example, there may be different ways for the first network device to update the first metric based on the metric of the further second network device as in step S118. For example, the first network device may be configured to, in a step S118a, set the first metric to a value worse than that of the metric of the further second network device.

This updated metric may then be forwarded to any children of the first network device. Hence, the first network device may be configured to, in a step 120, report the updated first metric to the third network device. The third network device may then in turn update its own metric, provide a report thereof to any children it may have, and so on.

There may be different kinds of metrics to be used. Without loss of generality, a low metric is here considered to be a good metric, and vice versa. Some non-limiting examples will now be described in turn. According to one example the metric represents the number of hops to a network node serving the wireless mesh network. That is, the metric of a particular network device pertains to the number of wireless links that need to be established (or the number of wireless devices that need to act as relay) in order for the particular network device to be able to communicate with the network node. Since it is generally considered advantageous to require as few hops as possible; the fewer the number of hops, the better the metric, and vice versa. Similarly, the metric may be an airtime link metric; the lower the airtime, the better the metric. Further, the metric may be provided as a priority index. The priority index may be based on number of hops and/or the airtime, but may consider further parameters as well, for example the quality, throughput, etc., of its established connection towards the network node serving the wireless mesh network. For example, although two network devices have the same number of hops to the network node, one of these two network devices may have a better metric if its established connection towards the network node offers higher quality and/or throughput than the established connection towards the network node of the other of the two network devices.

Two particular embodiments for reconfiguration in a wireless mesh network will now be disclosed with references to the wireless mesh networks of FIGS. 1 to 5.

Figure 2:
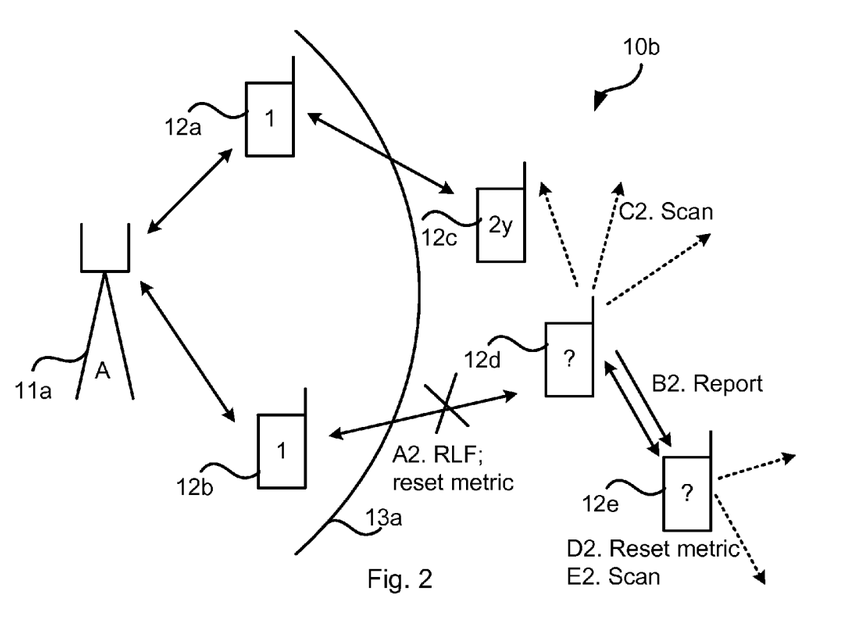
Figure 3:
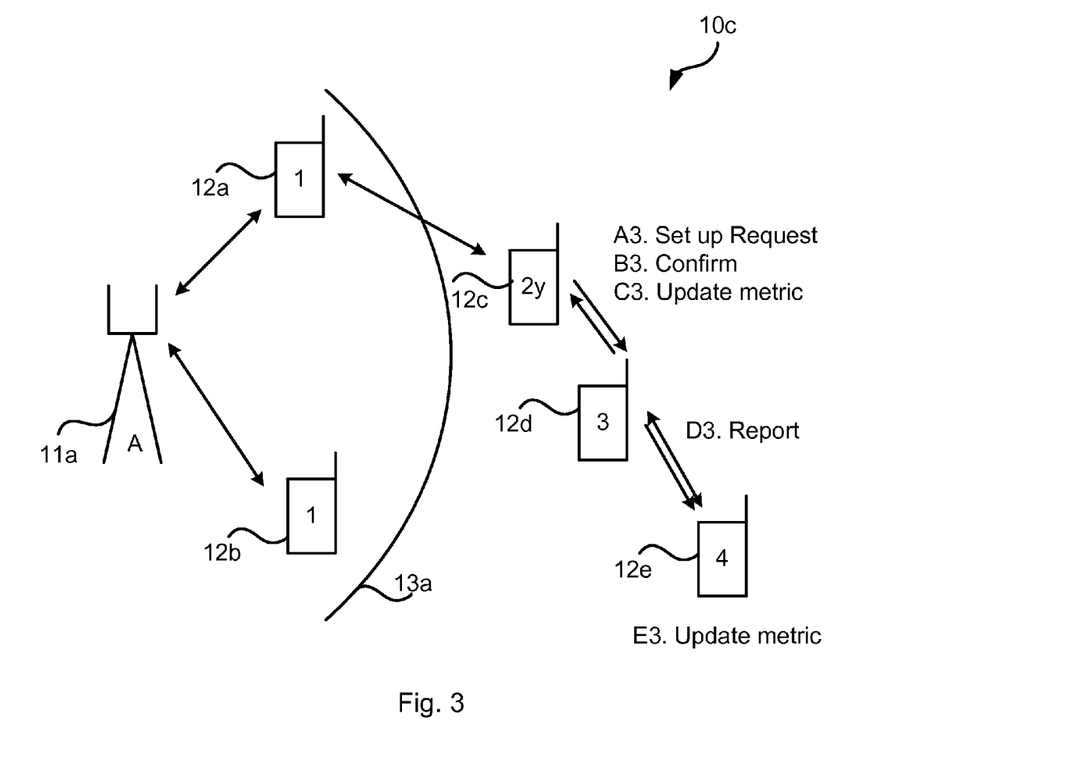

FIGS. 1 to 3 schematically illustrate the principles of the first particular embodiment.

FIG. 1 schematically illustrates a wireless mesh network 10a where a first network device 12d is involved in initial communications. FIG. 1 has been described above and references are therefore made to the above description of FIG. 1.

FIG. 2 schematically illustrates a wireless mesh network 10b where the first network device 12d experiences a radio link failure.

In FIG. 2 a radio link failure (RLF) occurs on the link between network device 12b and network device 12d. Hence the operative connection between the network device 12b and the network device 12d is lost. Thus, the network device 12d drops its connection to the network device 12b with metric value "1" and the metric value of network device 12d is reset (as indicated by the metric value "?") in action A2. The RLF may have many different origins, but is typically detected by the network device 12d by monitoring the link quality according to principles known to the skilled person. Once the RLF is detected information about the RLF is fed in a message, that may be a radio resource control (RRC) reconfiguration message, to network device 12e operatively connected to the network device 12d in action B2. The network device 12d then starts to scan for another parent network device to connect to, action C2. The scanning may be on the same or another other RATs compared to the RAT used for providing the link to the network device 12b. Scanning may also be started at network device 12e, which in turn reset its metric (as represented by metric value "?") in action D2 and starts scanning in action E2. Alternatively, the resetting and scanning in actions D2 and E2 may not start until further information is received from the parent, i.e., network device 12d (for instance, that the parent could not detect another network device to attach to).

FIG. 3 schematically illustrates a wireless mesh network 10c where the first network device performs reconfiguration.

Network device 12d is now assumed to have found network device 12c during the scanning in action C2, by means of a set up request being sent from network device 12d, action A3. A confirmation of connection and set up message is therefore sent from network device 12c, action B3. The confirmation message may include verification that the metric value of the found network device 12c is valid, i.e. that the found network device 12c is not in detached state. In particular, should the found network device 12c have a worse metric than the invalidated metric of the network device 12d (i.e., a worse value than "2x"), verification that the network device 12d does not connect to one of its own children or grandchildren etc., is performed. The set up message may include information of node capabilities, quality of service needed, subscriptions, etc. For example, the network device 12c may be a network device having a subscription with another operator (PLMN) than the network device 12d and hence a roaming cost may be required for the network device 12d to be operatively connected to the network device 12c. Once the connection has been confirmed and acknowledged, the metric of the network device 12d is updated to a value worse than that of the network device 12c, say, the metric value "3", action C3. Furthermore, the network device 12d sends a reconfiguration message to its children (i.e., network device 12e), action D3. The reconfiguration message includes the updated metric of the network device 12d, and, optionally, information about the new connection properties. The connection properties may for instance be connection quality in terms of throughput, latency, RAT, frequency band used, costs (in case of roaming), etc. The network device 12e updates its own metric to a value worse than that of the network device 12d, say, the metric value "4", action E3 and continue propagating the information to any possible other downstream operatively connected network devices.

Figure 4:
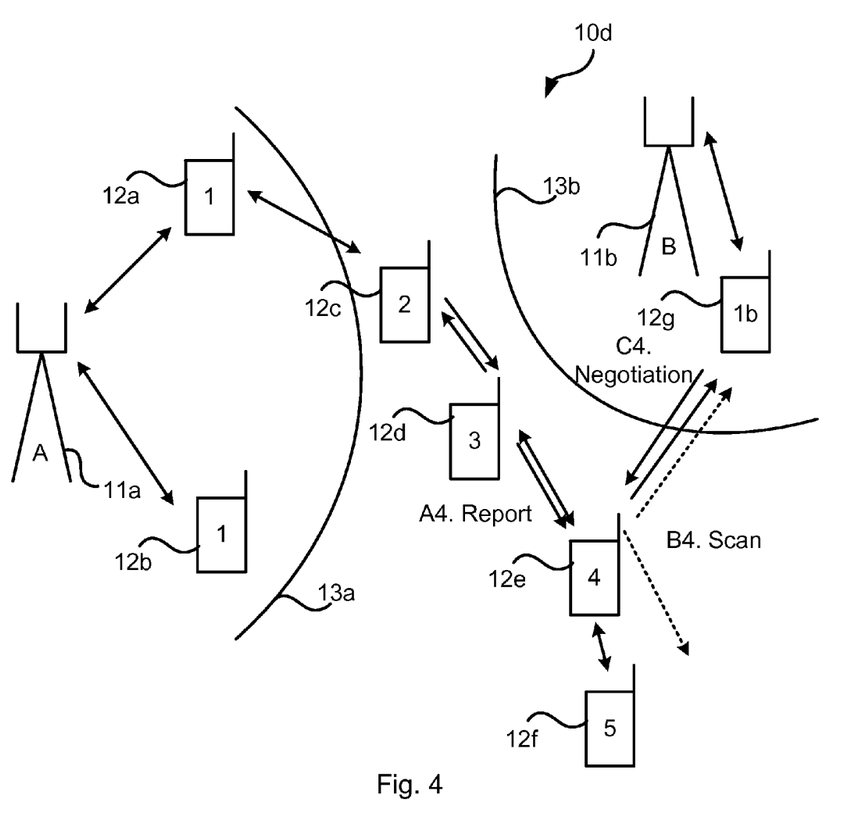
Figure 5:
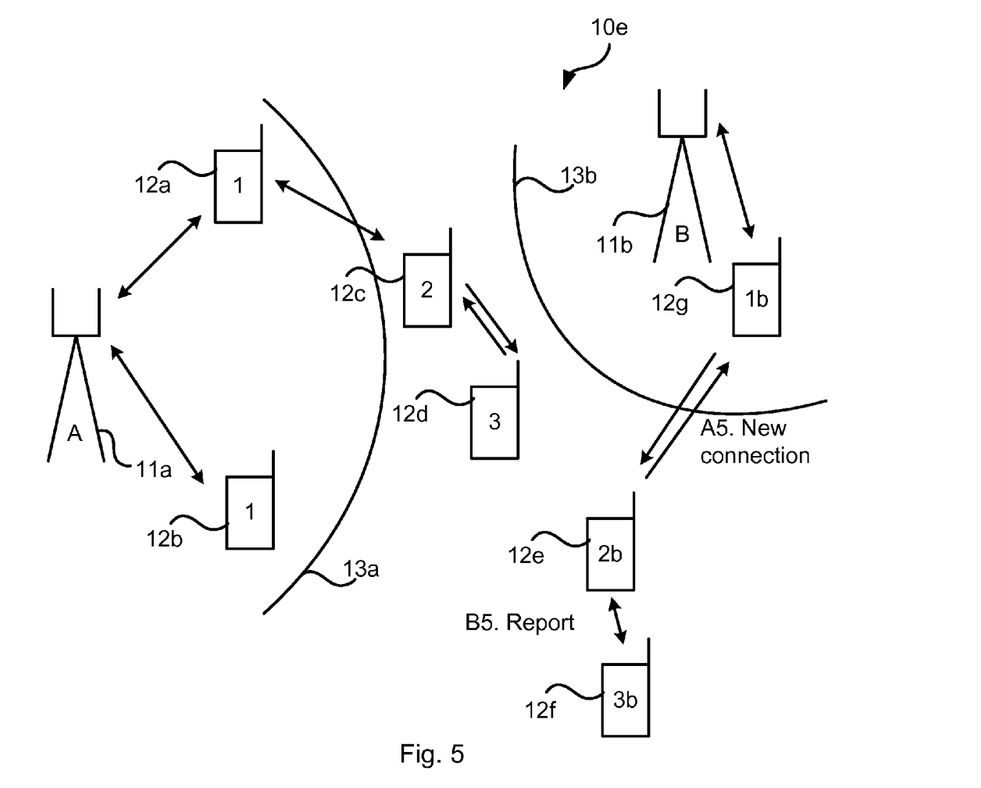

FIGS. 4 and 5 schematically illustrate the principles of the second particular embodiment.

FIG. 4 schematically illustrates a wireless mesh network 10d where the first network device receives a reconfiguration message.

In FIG. 4 the network node 11a, denoted network node A, and the network node 11b, denoted network node B, act as gateways to a network outside the wireless mesh network 10d. Seven network devices 12a-12g are involved in the wireless mesh network 10d. Network devices 12a, 12b are within the coverage range 13a of the network node 11a and thus have direct connection to the network node 11a and therefore have a good metric, represented by the metric value "1". Network device 12g is within the coverage range 13b of the network node 11b and thus has direct connection to the network node 11b and therefore has a good metric, represented by the metric value "1b". Here the "b" in "1b" denotes that network device 12g has an operative connection to network node B.

This embodiment is provided as an alternative and/or extension to the first particular embodiment for the situation in FIG. 3, where the network device 12e receives the reconfiguration report from network device 12d about a new connection path to the serving network node 11a, action A4. Action A4 in FIG. 4 thus corresponds to action D3 in FIG. 3. Based on the received connection properties, network device 12e determines that the new operative connection may not provide the most optimal connection to the network outside the wireless mesh network 10d. The network device 12e therefore starts to scan for a possible new parent, action B4. It is assumed that network device 12e finds network device 12g which is operatively connected to network node 11b. A negotiation for connection setup is therefore made between network device 12e and network device 12g, action C4. This negotiation is similar to the negation in actions A3 and B3 of FIG. 3 and further description thereof is omitted.

FIG. 5 schematically illustrates a wireless mesh network 10e where the first network device performs reconfiguration.

If the metric of the network device 12*g* is better than the metric of network device 12*d*, the network device 12*e* detaches from network device 12*d* and establishes an operative connection to network device 12*g*. In the present illustrative case, the network device 12*g* has metric value "1b" which is assumed to be better than metric value "3". A new connection is therefore established between the network device 12*e* and the network device 12*g*, action A5. The metric of the network device 12*e* is updated to metric value "2b", and updated connection properties and metric etc. are reported to the children (as represented by network device 12*f*) of the network device 12*e*, action B5, which in turn update their metric (in the present illustrative example to metric value "3b"). Here the "b" in "2b" and "3b" denotes that network devices 12*e* and 12*f* have operative connections to network node B.

In summary, the herein disclosed embodiments thus cover a protocol, methods and a network device (as exemplified by the first network device) for reconfiguration information of connections in a wireless mesh network in case another network device (as exemplified by the second network device) becomes detached from the wireless mesh network.

According to at least some embodiments, a first network device determines that an operative connection to a second network device with a better metric than the first network device is detached. The first network device reports this to any operatively connected third network devices with worse metric than the first network device, and start to scan for a further (i.e., new) second network device to operatively connect to. Once a further second network device is detected, possibly on another RAT, negotiation of connection setup is made and once an operative connection has been established, the metric of the first network device is updated and reported, possibly together with other connection information, such as capacity, cost etc. to any operatively connected third network devices.

According to at least some embodiments, the first network device receives a message from a network device, such as a parent network device, with better metric than the first network device. The message includes a reconfiguration message of the operative connection to the second network device. The reconfiguration message may comprise parameters indicating, for instance, that sufficient QoS cannot be maintained, that the roaming cost is too high, etc. Based on the reconfiguration message the first network device starts to scan for new connections (i.e., a connection to a further second device device), possible on other RATs, and once such a further network device with connection properties better than the current connection is found, the first network device detaches from the second network device acting as its current parent network device and reconnects to the further second network device that thus becomes the new parent network device. Once negotiation of connection setup is made and once an operative connection has been established, the metric of the first network device is updated and reported, possibly together with other connection information, such as capacity, cost etc. to any operatively connected third network devices.

The inventive concept has mainly been described above with reference to a few embodiments. However, as is readily appreciated by a person skilled in the art, other embodiments than the ones disclosed above are equally possible within the scope of the inventive concept, as defined by the appended patent claims.

The invention claimed is:

1. A method for reconfiguration in a wireless mesh network served by at least one network node, the method being performed by a first network device having a first metric, the method comprising:
    maintaining an operative connection to a network node via a second network device, the second network device having a better metric than the first metric;
    acquiring an indication that the first network device is to be detached from the operative connection to the network node;
    prior to the first network device detaching from the operative connection to the network node and in response to the acquired indication, scanning for, and establishing an operative connection to, a further second network device having a metric for establishing a new operative connection to one of the at least one network node; and
    updating the first metric based on the metric of the further second network device.

2. The method according to claim 1, wherein maintaining said operative connection further comprises:
    maintaining an operative connection to a third network device having a worse metric than the first metric.

3. The method according to claim 2, further comprising:
    reporting the indication to the third network device.

4. The method according to claim 2, further comprising:
    reporting the updated first metric to the third network device.

5. The method according to claim 2, further comprising:
    obtaining connection properties from the further second network device, the connection properties comprising at least one of capacity, cost, quality of service, and identity of the further second network device; and
    reporting the connection properties to the third network device.

6. The method according to claim 2, wherein the first network device is hierarchically downstream the second network device and hierarchically upstream the third network device in relation to a network node serving the wireless mesh network.

7. The method according to claim 1, wherein said operative connection to the network node is to be detached between the first network device and the second network device.

8. The method according to claim 1, wherein said operative connection to the network node is to be detached between the network node and the second network device.

9. The method according to claim 1, wherein acquiring said indication comprises:
    detecting that the operative connection to the second network device is out-of-sync.

10. The method according to claim 1, wherein acquiring said indication comprises:
    receiving a reconfiguration message from a network device having a metric better than the first metric.

11. The method according to claim 1, wherein acquiring said indication comprises:
    determining that sufficient quality of service of the operative connection to the second network device cannot be maintained.

12. The method according to claim 1, further comprising:
    disconnecting the operative connection to the second network device before establishing the operative connection to the further second network device.

13. The method according to claim 1, further comprising:
    disconnecting the operative connection to the second network device after having verified that the operative connection to the further second network node is to be established.

14. The method according to claim 1, wherein the metric of the further second network device is better than the first metric.

15. The method according to claim 1, wherein scanning for the further second network device comprises:
    resetting the first metric to a value worse than its current value.

16. The method according to claim 1, wherein scanning for the further second network device comprises:
    obtaining an identity of the further second network device.

17. The method according to claim 1, wherein the metric of the further second network device is worse than the first metric, said scanning further comprising:
    confirming that the further second network device is currently neither directly nor indirectly operatively connected to the third network device.

18. The method according to claim 17, wherein said confirming comprises:
    obtaining auxiliary information about the further second network device, the auxiliary information revealing any current operative hierarchical relation between the first network device and the further second network device.

19. The method according to claim 18, wherein said auxiliary information is provided as an address list, and/or as an identity list of network devices currently being operatively connected to the further second network device.

20. The method according to claim 1, wherein updating the first metric based on the metric of the further second network device comprises:
    setting the first metric to a value worse than that of the metric of the further second network device.

21. The method according to claim 1, wherein in a case at least two further second network devices are found during the scanning, said at least two further second network devices having identical metrics:
    obtaining auxiliary metric data from said at least two further second network devices; and
    establishing the operative connection to the one of the at least two further second network devices having best auxiliary metric data.

22. The method according to claim 1, wherein in a case at least two further second network devices are found during the scanning, said at least two further second network devices having identical metrics:
    randomly selecting which one of the at least two further second network devices to establish the operative connection to.

23. The method according to claim 1, wherein the metric of the further second network device is worse than the metric of the second network device.

24. The method according to claim 1, wherein each metric pertains to number of hops to a network node serving the wireless mesh network.

25. The method according to claim 1, wherein the metric is an airtime link metric.

26. The method according to claim 1, wherein the metric is provided as a priority index.

27. The method according to claim 1, wherein the scanning is performed using at least one other radio access technology than the radio access technology used for the operative connection to the second network device.

28. The method according to claim 1, wherein the wireless mesh network is operated using at least two radio access technologies, is operated using at least one licensed frequency band, and at least one non-licensed frequency band, comprises at least two sub-mesh networks, provides at least two types of services, and/or is operated by at least two service providers.

29. A network device for reconfiguration in a wireless mesh network served by at least one network node, the network device having a first metric and comprising processing circuitry, the processing circuitry comprising:
    a maintain operative connection module that maintains an operative connection to a network node via a second network device, the second network device having a better metric than the first metric;
    an acquire information module that acquires an indication that the first network device is to be detached from the operative connection to the network node;
    a scan for operative connection module that, prior to the first network device detaching from the operative connection to the network node and in response to the acquired indication, scans for a further second network device having a metric for establishing a new operative connection to one of the at least one network node;
    an establish operative connection module that establishes an operative connection to the further second network device; and
    an update metric module that updates the first metric based on the metric of the further second network device.

30. The network device according to claim 29, wherein the processing circuitry further is configured to cause the network device to maintain an operative connection to a third network device having a worse metric than the first metric.

31. The network device according to claim 29, further comprising a storage medium storing a set of operations, and wherein the processing circuitry is configured to retrieve said set of operations from the storage medium to cause the network device to perform said set of operations, wherein said set of operations comprise operations of the acquire information module, the scan for operative connection module, the establish operative connection module, and the update metric module.

32. The network device according to claim 31, wherein said set of operations is provided as a set of executable instructions.

33. A system comprising a network device, a second network device, a further second network device, and a third network device configured according to claim 29.

34. A nontransitory computer readable storage medium comprising a computer program for reconfiguration in a wireless mesh network served by at least one network node, the computer program comprising computer code which, when run on processing circuitry of a first network device having a first metric, causes the first network device to:
    maintain an operative connection to a network node via a second network device, the second network device having a better metric than the first metric;
    acquire an indication that the first network device is to be detached from the operative connection to the network node;
    prior to the first network device detaching from the operative connection to the network node and in response to the acquired indication, scan for, and establish an operative connection to, a further second network device having a metric for establishing a new operative connection to one of the at least one network node; and update the first metric based on the metric of the further second network device.

\* \* \* \* \*